Jan. 5, 1965 K. WANDEL 3,164,329
WASTE DISPOSAL APPARATUS
Filed Nov. 1, 1962 2 Sheets-Sheet 1
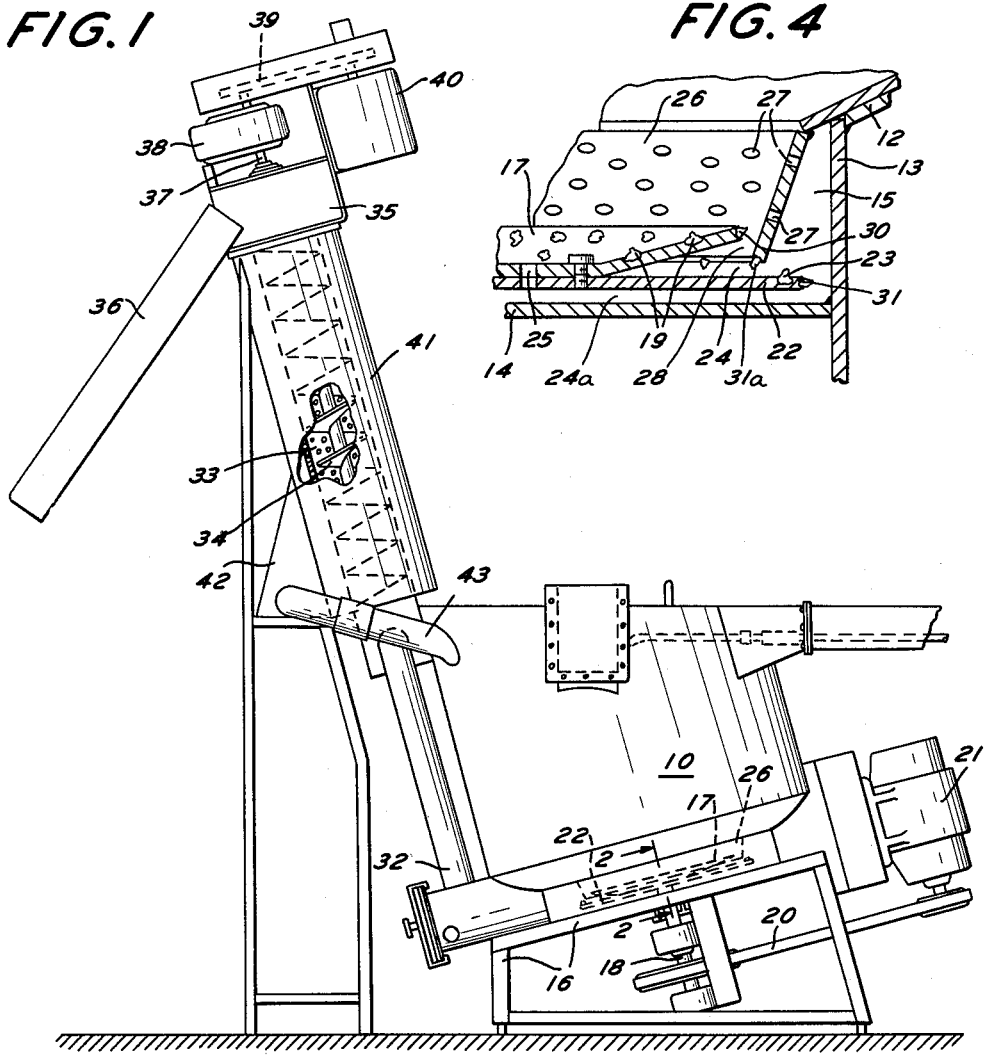
INVENTOR.
KURT WANDEL Jan. 5, 1965  K. WANDEL  3,164,329
WASTE DISPOSAL APPARATUS
Filed Nov. 1, 1962  2 Sheets-Sheet 2
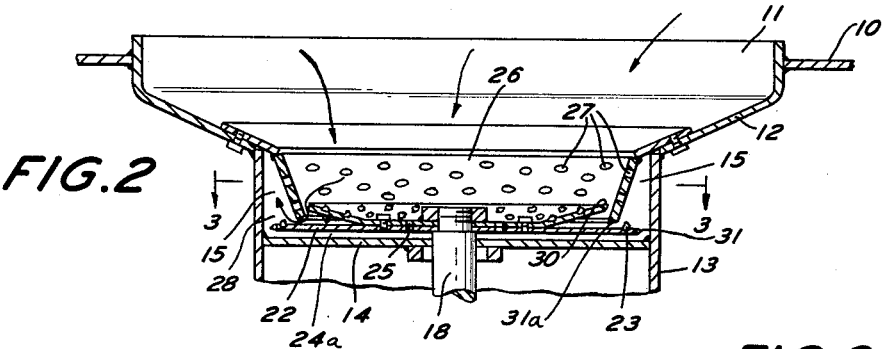
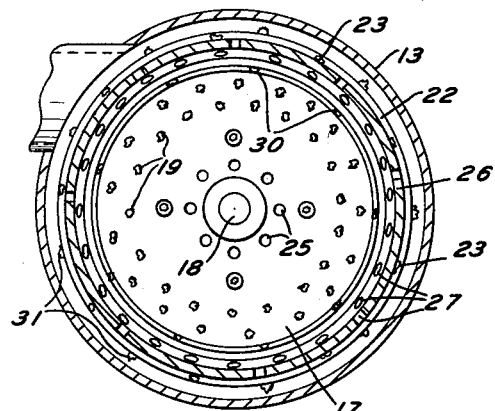
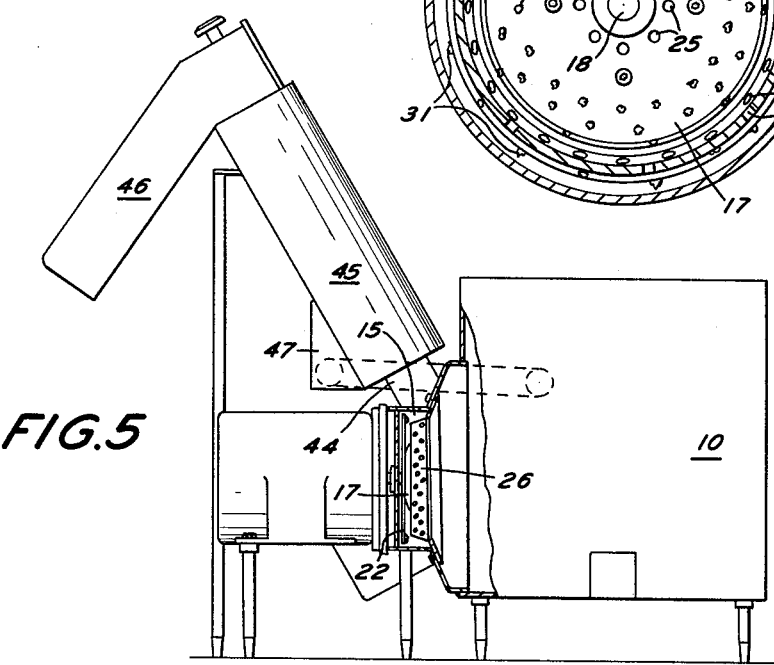
INVENTOR.
KURT WANDEL

United States Patent Office 3,164,329
Patented Jan. 5, 1965

3,164,329
WASTE DISPOSAL APPARATUS
Kurt Wandel, Downingtown, Pa., assignor to Somat Corporation, Coatesville, Pa., a corporation of Delaware
Filed Nov. 1, 1962, Ser. No. 234,652
4 Claims. (Cl. 241—74)

The present invention relates to an apparatus for disintegrating waste material and more particularly to a novel impeller assembly in combination with a hydro-extractor forming a complete unitary waste disposal unit.

Waste disposal machines as heretofore constructed have been used initially and primarily for the disintegration of waste paper from office buildings and the like where daily accumulation of such material necessitates prompt removal in bulk form. With the introduction of disintegrating units bulk carrying away has been eliminated and costs of disposal materially reduced. With the expanded use of such machines to handle waste from restaurants, cafeterias, hotels, the economical handling of garbage, agricultural products, paper cups, food waste, corn husks and the like have introduced problems not solved by present day equipment. For example the failure to properly emacerate corn husks, raw vegetables as well as modern paper material and paper cups having surfaces treated with polyethylene for strength and water resistance.

An object of the invention is to provide a combined disintegrating impeller assembly and a hydro-extractor to overcome the foregoing disadvantages.

Another object is to provide a radically new impeller assembly for disintegrating all kinds of waste material in a waste disposal machine.

Generally considered the foregoing objects are carried out by a tank containing waste paper, fibrous material, garbage and other disposable waste in the presence of a high percentage of water, all subjected to the disintegrating action of a rotatable impeller having a working face with projecting cutters, such as tungsten carbide, as shown in applicant's patent No. 2,729,146. Associated with the tank discharge there is a tube acting as a sieve about the area of the projected material to grade the latter so that certain broken up portions of the material can be remacerated for discharge. All water laden disintegrated material is withdrawn and delivered to a hydro-extractor which separates the usable mulch and returns the residual water to the tank. Also associated with the screening tube is a novel means for producing a dominant back pressure on the outlet side of the tube to blow out any material clogging the tube apertures.

In the accompanying drawings:

FIG. 1 is a side elevation view, partly broken away of a waste disposal machine embodying the invention;

FIG. 2 is an enlarged sectional view on line 2—2 of FIG. 1;

FIG. 3 is a section view on line 3—3 of FIG. 2;

FIG. 4 is an enlarged fragmentary sectional view on line 4—4 of FIG. 2; and

FIG. 5 is an elevation view of a modified form of the machine.

Referring to the drawings and initially to FIGS. 1 and 2, a tank 10 is shown into which waste paper, paper cups, garbage and other material is discharged to be disintegrated and transformed into usable mulch. The tank 10 has a tubular extension 11 formed by an inclined side 12 converging into the vertical tank wall 13 which rises from a suitable base. The tank bottom 14 spans the wall 13 and is spaced from the outlet end of the side 12 to form a transverse chamber 15. Preferably the base of the tank 10 is mounted upon a suitable frame 16 with the axis of the tank inclined to the vertical.

For disintegrating the material, a disk impeller 17 is transversely disposed in the chamber 15, where it is rotatably carried as an attached part of a shaft 18 which is journalled in the bottom 14 and driven by a belt 20 from a motor 21. The motor 21 is operatively supported by the frame 16. The working upper face of the impeller 17 is preferably concave and carries a plurality of discrete projecting tungsten carbide cutters 19 as a macerating means. Such cutter follows the teaching of applicant's patent No. 2,729,146.

As an auxiliary grinding means, a second impeller disk 22 is attached to the opposite face of the disk 17 from that having the cutters and has a diameter greater than that of the impeller 17 to project into close proximity to the wall 13 of the tank 10. This encircling projecting portion, preferably has a number of upwardly projecting carbide cutters 23. Also it should be noted that by reason of the concave shape of the impeller 17 and the attached planar disk 22, the two disks form a circumferential slot 24 opening into the chamber 15.

The impeller disk 22 is spaced from the tank bottom 14 for free rotation, such space 24ᵃ communicating circumferentially with the discharge portion of the chamber 15. Also a plurality of holes 25 are made through the disks 17 and 22 encircling the axis of rotation to connect the grinding space of the chamber 15 with the space 24ᵃ. These holes 25 introduce pressure into the space 24ᵃ to keep it clear of backed-up material at the exit.

For controlling the consistency of the water laden pulp resulting from the work of the impeller 17, a tubular member 26 projects into the chamber 15 and being welded at one end about the tank outlet formed by the sides 12. Preferably, but not necessarily, the depending member sides converge downwardly to terminate in spaced relation to the disk 17 at one side while spaced from the wall 13 to thereby form an auxiliary outlet around the member 26 leading from the inner portion of the chamber 15 to the discharge portion thereof. The member 26 is provided with a plurality of apertures 27, of pre-determined size, arranged to lie in the path of centrifugally projected macerated material. Thus the member 26 functions as a sieve to separate oversize disintegrated material and return such for further breaking up. This returned portion falls into the entrance of the outlet passage 28 formed between the rim of disk 17 and the end of the sieve member 26 and leading to the discharge portion of the chamber 15. As the rejected material traverses the passage 28 it is subjected to a supplemental grinding by cutters 30 projecting radially from the rim of the disk 17 and also by radially disposed cutters 31 projecting from the rim of the disk 22. The material so ground passes under the inner end of the member 26 for a final cutting by cutters 31ᵃ projecting from such end of the member 26 into the path of material moving through the passage 28 into the chamber 15.

In this connection it should be noted that since the rim of the disk 22 terminates in close proximity to the wall 13 of the tank, an unexpected result takes place because the material leaving the outlet passage 28 under centrifugal force rebounds from the wall 13 with sufficient back pressure to wipe away any material collecting at the exit of the apertures 27 in the member 26.

As shown in FIG. 1 the complete disposal unit includes the coacting hydro-extractor and the tank with its disintegrating assembly preferably mounted angularly with respect to the horizontal and with the lower end of the chamber 15 opening into a conveyor pipe 32, which rises angularly upward to discharge the water laden pulp into a perforated tube 33 to be fed upwardly by a lifting screw conveyor 34 therein. The conveyor 34 delivers the substantially dewatered fibrous mulch into a header 35 from which it is delivered into a chute 36 to fall by gravity into a truck, bags or other collectors. A suitable drive for the conveyor 34 includes shaft 37, a speed reduction unit 38, driven by a belt 39 from a motor 40 carried by the machine frame.

In order to return the extracted water, the conveyor 34 is housed in a cylindrical casing 41 having an offset discharge 42 leading from the lower end portion of the casing 41 to discharge into a chute 43 and thence to the interior of the tank 10. The casing 41 coaxially encircles the perforated tube 33 in spaced relation to provide for the free flow of extracted water to the discharge 42. As so assembled the disintegrated pulp slurry discharges under the applied centrifugal force of the dual impeller to be lifted by way of the pipe 32 into the inlet of the hydro-extractor tube 33.

In the modification shown in FIG. 5 the tank 10 has its discharge on the side with the impeller assembly mounted upon a horizontal axis and driven from a suitable means in the adjacent mounted housing. In this modification the discharge chamber 15 opens into a pipe 44 to convey the water laden pulp to the hydro-extractor, similar to that shown in FIG. 4, and schematically identified as screw tube casing 45, in which the pulp is dewatered and delivered to chute 46 as heretofore explained. The extracted residual water returns to the tank 10 by trough 47.

It will now be apparent that a complete unitary combination of interacting disintegrating impeller assembly and a hydro-extractor has been devised, wherein waste disposal material such as garbage, paper waste of all kinds, straw, grass, leaf veins and stems, polyethylene treated paper, food waste, fibrous raw products, corn husks and the like, can be successfully macerated, in the present if a high percentage of water, delivered, as a continuous operation, to a coaxing hydro-extractor in the form of water laden pulp, such pulp being dewatered to a predetermined consistency mass while the extracted water therefrom is returned to the disintegrating chamber to maintain the volumetric content substantially uniform.

Having now described my invention, I claim:

1. A waste disposal unit comprising an annular wall and a bottom forming a tank for receiving waste material and water, a concave disk impeller in said tank circumferentially spaced from said wall, material disintegrating cutters on the concave face of said impeller, a planar disk attached to said impeller on the face opposite said concave face, a sieve in the form of a tubular member having through apertures supported in said tank concentric with and encircling said impeller, a discharge space formed between said sieve and said wall to receive material passed through said sieve, said sieve being spaced from said planar disk providing a passage therebetween, and means to rotate said impeller and said disk together.

2. A waste disposal unit according to claim 1 wherein cutters project radially from said planar disk.

3. A waste disposal unit comprising an annular wall and a bottom forming a tank for receiving waste material and water, a concave disk impeller in said tank circumferentially spaced from said wall, cutters on the concave face of said impeller, a planar disk attached to the impeller face opposite to said concave face, a sieve in the form of a tubular member having through apertures supported in said tank concentric with and encircling said impeller, a discharge space formed between said sieve and said wall to form a space to receive material discharged through said sieve, said planar disk having a greater diameter than said impeller to form an extension terminating within said discharge space and spaced from said tank bottom to form a circumferential slot opening into said discharge space.

4. A waste disposal unit according to claim 3 wherein said impeller has holes therethrough communicating with said slot to introduce pressure to prevent disintegrated material collecting in said slot.

References Cited by the Examiner
UNITED STATES PATENTS

| | | | |
|---|---|---|---|
| 1,130,149 | 3/15 | Conway | 100—145 X |
| 2,464,588 | 3/49 | Knudsen et al. | 241—297 X |
| 2,641,971 | 6/53 | Ellis | 241—74 |
| 2,730,308 | 1/56 | Jordan. | |
| 2,828,084 | 3/58 | James et al. | |
| 2,937,815 | 5/60 | Eirich et al. | 241—296 X |
| 2,970,776 | 2/61 | Buckman. | |
| 2,970,777 | 2/61 | Hardy et al. | |

FOREIGN PATENTS

| | | |
|---|---|---|
| 166,527 | 8/22 | Great Britain. |

J. SPENCER OVERHOLSER, *Primary Examiner.*

ABRAHAM G. STONE, WALTER A. SCHEEL,
*Examiners.*